United States Patent [19]

Herr

[11] Patent Number: 4,903,996

[45] Date of Patent: Feb. 27, 1990

[54] FASTENER SYSTEM FOR PIPE COUPLING BANDS

[75] Inventor: Richard W. Herr, Miami, Fla.

[73] Assignee: Man-O-War, Inc., Miami, Fla.

[21] Appl. No.: 95,857

[22] Filed: Sep. 14, 1987

[51] Int. Cl.⁴ .............................................. F16L 21/06
[52] U.S. Cl. ........................................ 285/39; 285/419
[58] Field of Search .................. 285/419, 373, 424, 39

[56] References Cited

U.S. PATENT DOCUMENTS

| | | | |
|---|---|---|---|
| 3,154,330 | 10/1964 | Clark et al. | 285/419 |
| 3,229,998 | 1/1966 | Pennington | 285/419 |
| 3,266,109 | 8/1966 | Thomas | 285/921 X |
| 4,248,459 | 2/1981 | Pate et al. | 285/419 X |
| 4,273,367 | 6/1981 | Keeney et al. | 285/419 |
| 4,306,740 | 12/1981 | Kleykamp et al. | 285/39 |
| 4,483,556 | 11/1984 | LiVolsi | 285/903 X |

FOREIGN PATENT DOCUMENTS 2834078  2/1980  Fed. Rep. of Germany ...... 285/419

*Primary Examiner*—Thomas F. Callaghan
*Attorney, Agent, or Firm*—Fleit, Jacobson, Cohn, Price, Holman & Stern

[57] ABSTRACT

A coupling band for forming a pipe joint between adjacent ends of a pair of respective pipe lengths has an elongate fastener tongue at one end which is fed through a corresponding receiver at the other end of the band. The tongue and the receiver are provided with complementary ratchet-type teeth so that the tongue can be fed through the receiver in a band-tightening direction and so that the teeth will effectively hold the tongue within the receiver, preventing it from being withdrawn in a band-relaxing direction. A manually operated rotary ratcheting tool is provided for feeding the tongue through the receiver in order to tighten the band when forming the pipe joint. When the band has been tightened to the required extent, the ratcheting tool is removed and a leading end of the tongue which has passed through the receiver is bent back over the top of the receiver in the form of a hook providing additional security against release of the band.

9 Claims, 4 Drawing Sheets

FASTENER SYSTEM FOR PIPE COUPLING BANDS

FIELD OF THE INVENTION

This invention relates generally to coupling bands used for securing together the ends of adjacent pipe lengths, such as lengths of corrugated metal pipe, to form a pipe joint therebetween. More particularly, the invention relates to a novel system, involving both method and apparatus, for applying and securely fastening such bands.

BACKGROUND OF THE INVENTION

Lengths of corrugated metal pipe are commonly coupled together end-to-end by means of an external circumferential coupling band which is drawn tightly around adjacent pipe ends and fastened in place by suitable connectors at opposite ends of the band. Circumferential seals may be provided between the respective pipe ends and the coupling band.

Various systems, commonly employing bolt and nut-type connectors, have been proposed for tightening and fastening the bands in place. For example, U.S. Pat. No. 3,501,179 shows helically corrugated pipe sections with ends which are recorrugated strictly circumferentially and which are joined together by a circumferential coupling band which is itself corrugated to complement the corrugations on the ends of the respective pipe lengths. The opposite ends of the band are drawn tightly together and fastened around the pipe ends by adjustable fasteners comprising bolt and nut assemblies connected between fittings at the respective ends of the band. In order to tighten and fasten the band around the pipe ends, the bolts and nuts must be inserted in the respective fittings and drawn tight by means of a wrench or the like.

There have been numerous other proposals for coupling band fastener systems, but generally these tend to be somewhat complex, difficult to apply and release, particularly in situ, and difficult to tighten to precisely the optimum degree of tension.

SUMMARY OF THE INVENTION

It is an object of the invention to provide a novel fastening system for a pipe coupling band of the kind described, including fastener attachments on the band, and a method and means for tightening and securing same, the system being of a simple to use design, yet providing accurate tensioning and secure attachment of the band in coupling together adjacent pipe ends.

Another object of the invention is to provide a coupling band tightening and securement system which is extremely versatile in its applicability, both as regards the types and sizes of pipes to which it may be applied.

Still another object of the invention is to provide a coupling band tightening and securing system which can readily be used by a single operator and which includes a universal-type band coupling tool which can be operated in situ to apply coupling bands in a simple and expeditious manner.

Broadly stated, in fulfillment of the above and other objects, the invention provides a fastening system for tightening and securely attaching a coupling band in place around adjacent pipe ends to be joined. One aspect of the system involves the use of novel fastening means on the band including an elongated tongue on one end of the coupling band, the tongue having an outer surface provided with a longitudinal array of first ratchet teeth projecting therefrom, a fitting in the form of a channel-shaped tongue receiver on the opposite end of the band for receiving the tongue therein when the band is wrapped circumferentially around the pipe ends, the receiver having a top wall provided internally with a longitudinal array of second ratchet teeth complementary to the first ratchet teeth on the tongue, the respective ratchet teeth cooperating to allow the tongue to be fed lengthwise through the receiver in a band-tightening direction and to hold the tongue against withdrawal from the receiver in a band-relaxing direction. The system further includes a separate band-tightening tool releasably attachable to the fitting and comprising a lever-operated ratchet roller with a circumferentially disposed array of third ratchet teeth for engaging the ratchet teeth on the tongue and feeding same through the receiver in the band-tightening direction responsive to manual reciprocative movements of the lever effective to provide a ratcheting action between the respective ratchet teeth.

It will be evident that in use of the system, in its method aspect, a coupling band may be placed around a pair of pipe ends to be joined, the tongue inserted into the receiver by hand and tightened to the extent possible. The tightening tool may then be attached to the fitting and used to work the tongue through the fitting, as described, in order to tension the band around the pipe ends. When the required tension has been established (the lever-operating device of the tool may incorporate a torque-measuring mechanism), the tool may be removed, and the band will be securely held in tension around the pipe ends by interengagement of the respective ratchet teeth on the tongue and the receiver. The leading end of the tongue may then be bent back over the top of the receiver to form a hook connection between the tongue and the receiver, further enhancing the security of attachment and maintaining the tension of the band.

In a preferred form of the invention, only the trailing end of the tongue may be attached, for example, by spot welding, to a point spaced from the end of the band, so that the end section of the band under the tongue can be fed under the opposite end section of the band when the tongue is fed into the receiver. Further, the tightening tool may have a wedge or ramp-type insert for urging the leading end of the tongue upwardly as it emerges from the receiver thereby facilitating the subsequent bending of the tongue back over the receiver as described.

Additional features and advantages of the invention will become apparent from the ensuing description and claims read in conjunction with the attached drawings.

DESCRIPTION OF PREFERRED EMBODIMENTS

Figure 1:
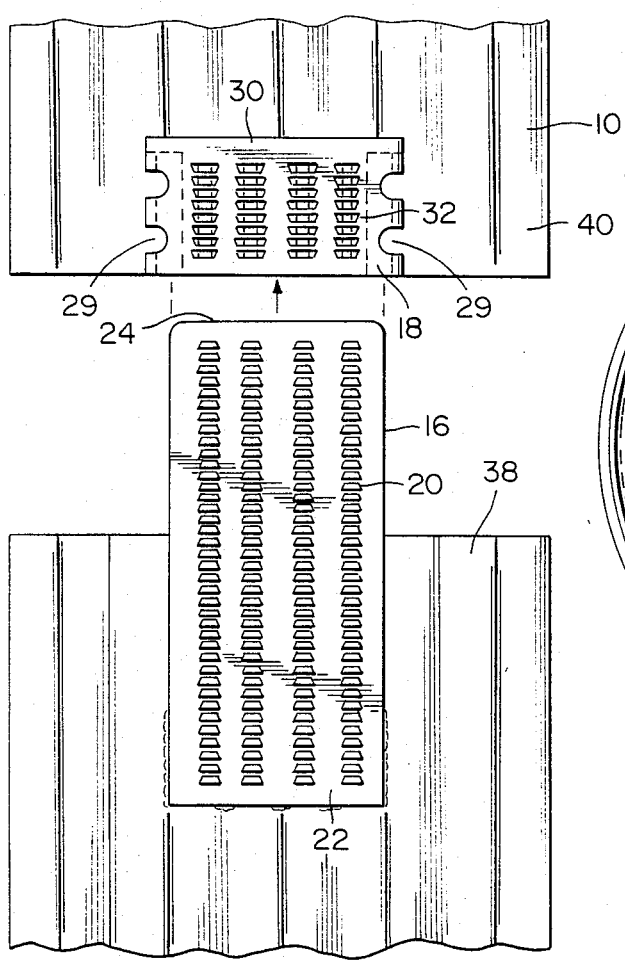
FIG. 1 is a plan view of a pipe coupling band having fastener attachments in accordance with the invention.

Referring initially to FIGS. 1-5, there is shown a corrugated sheet metal coupling band 10 of generally known form, which is used for providing a coupling joint between a pair of corrugated pipe ends 12, 14, by drawing and fastening the band tightly around the respective pipe ends, possibly with 0-ring, injected sealing compound, or like seals interposed between the band 10 and pipe ends. The pipes and band 10 are made of steel, galvanized or tar coated, or anodized aluminum, varying in diameter from 8 to 96 inches and varying in thickness from 12 to 16 gauge. In order to tighten and securely attach the band 10 around the pipe ends, the band is provided with interfitting fastener attachments 16, 18 in accordance with the invention at opposite ends of the band as hereinafter described.

Fastener attachment 16 comprises an elongated metal fastening tongue having four longitudinal rows of inclined ramp-like ratchet teeth 20 on an upper surface of the tongue and which may, for example, be stamped in the tongue. A trailing end portion 22 of the tongue is attached, as by spot welding, to an outer surface of coupling band 10 at a location spaced somewhat from the one end 24 of the band, so that the tongue can be separated lengthwise from the band to an extent.

Fastener attachment 18 comprises a flattish channel-shaped receiver for tongue 16 which may be cast or bent from metal plate to provide opposed edge flanges 26 which may be attached to the outer surface of band 10 adjacent end 24 of the band (opposite welded end 22) as by spot welding or the like through suitable openings 29 in a top wall 30 of the receiver. Wall 30 is provided internally with lengthwise rows of inclined ramp-like ratchet teeth 32 complementary with, but oppositely directed to, ratchet teeth 20. The teeth 32 may also be stamped from the body of receiver wall 30. The flanges 26 are cutaway at an outlet end 34 of the receiver to provide an accommodation space or recess 27 for a fastening tool as will be described.

It will be evident from the invention as thus far described that, in order to form a pipe joint, band 10 is wrapped circumferentially around the adjacent ends of the respective pipes, and tongue 16 is fed manually into the receiver 18 from inlet end 36 of the receiver. The configuration of the parts is such that end portion 38 of the band under tongue 16 can be fed under the opposite end portion 40 of the band on which the receiver is mounted. Also, the configuration of the respective sets of ratchet teeth 20 and 32 is such that the tongue 16 can be worked through receiver 18 in a band-tightening direction with ramp-wise ratcheting movement of the teeth over each other, but such that the teeth will effectively engage to inhibit withdrawal of the tongue from the receiver in a band-relaxing direction (except by depression of the tongue within the space of the receiver).

Initially, the tongue 16 may be manually pushed into and through the receiver to provide a degree of band tightening, but ultimate tightening of the band in the receiver may be effected by means of a tightening tool 42, still to be described with particular reference to FIGS. 6-11.

Figure 2:
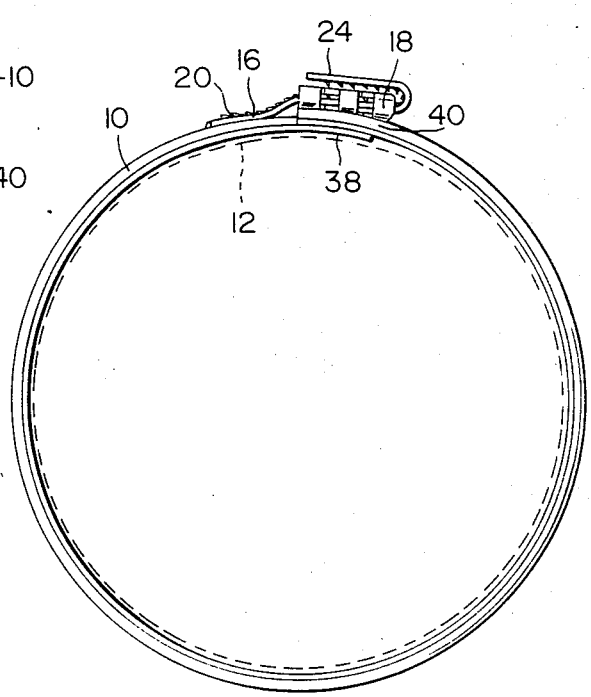
FIG. 2 is an elevational view of the coupling band as applied around a pair of pipe ends to form a pipe joint therebetween.
Figure 3:
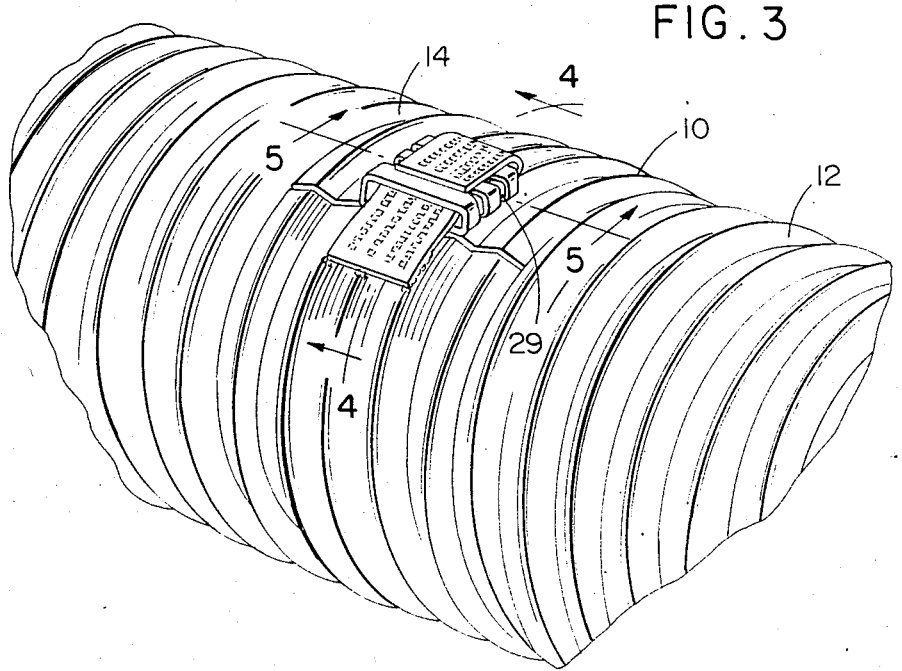
FIG. 3 is a perspective view of a completed pipe joint in accordance with the invention.
Figure 4:
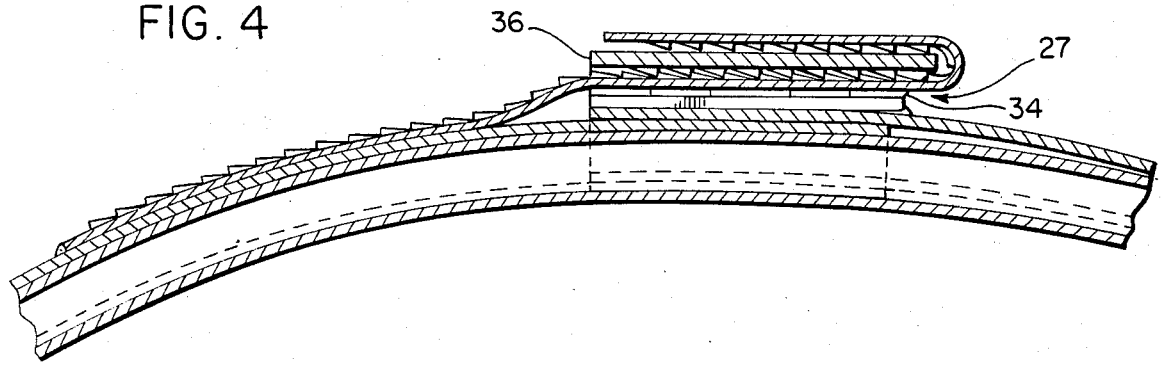
FIG. 4 is a sectional view on line 4—4 of FIG. 3.
Figure 5:
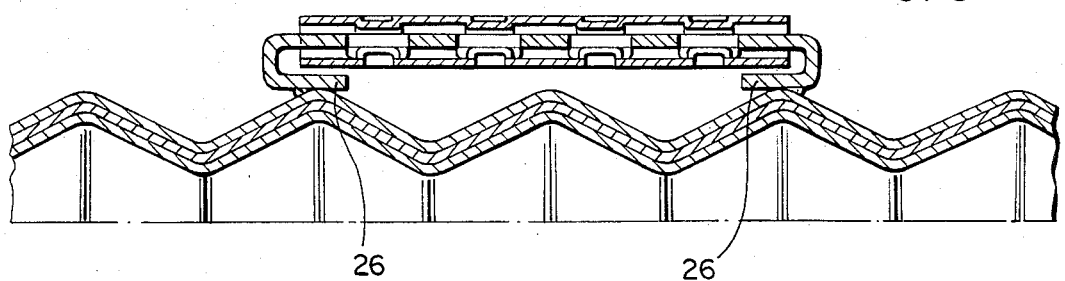
FIG. 5 is a sectional view on line 5—5 of FIG. 3.
Figure 6:
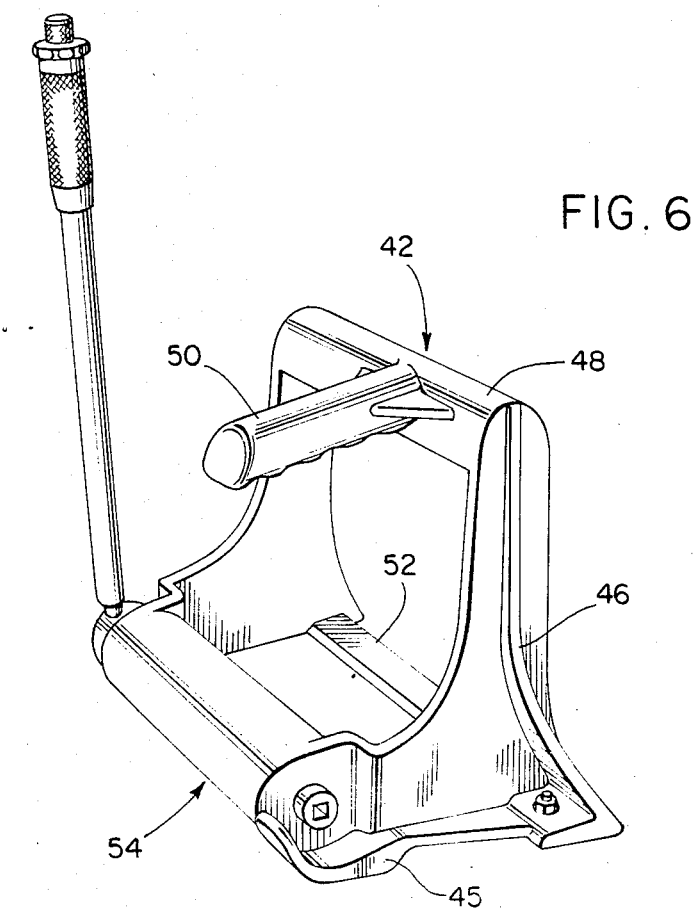
FIG. 6 is a perspective view of a manual tool for use in tightening and fastening the coupling band to form a pipe joint.
Figure 7:
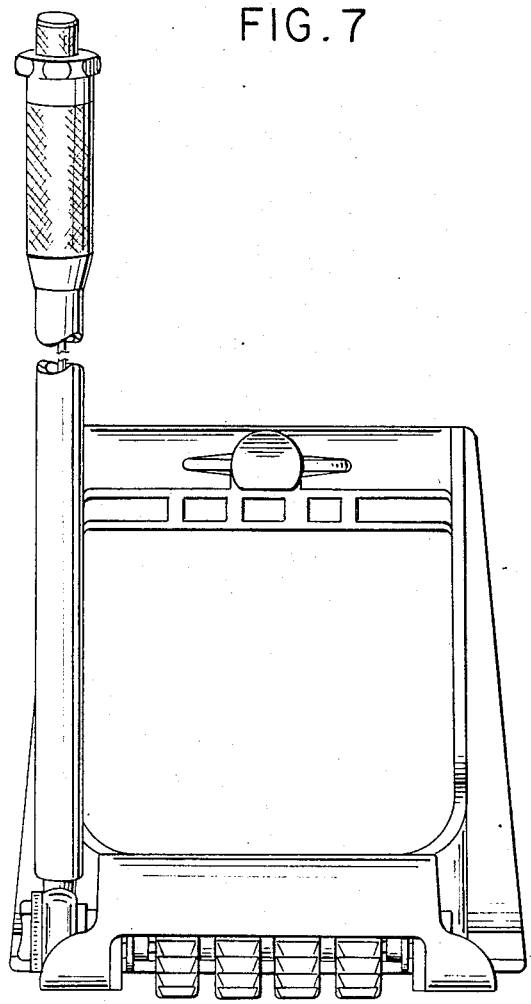
FIG. 7 is a front elevational view of the fastening tool.
Figure 8:
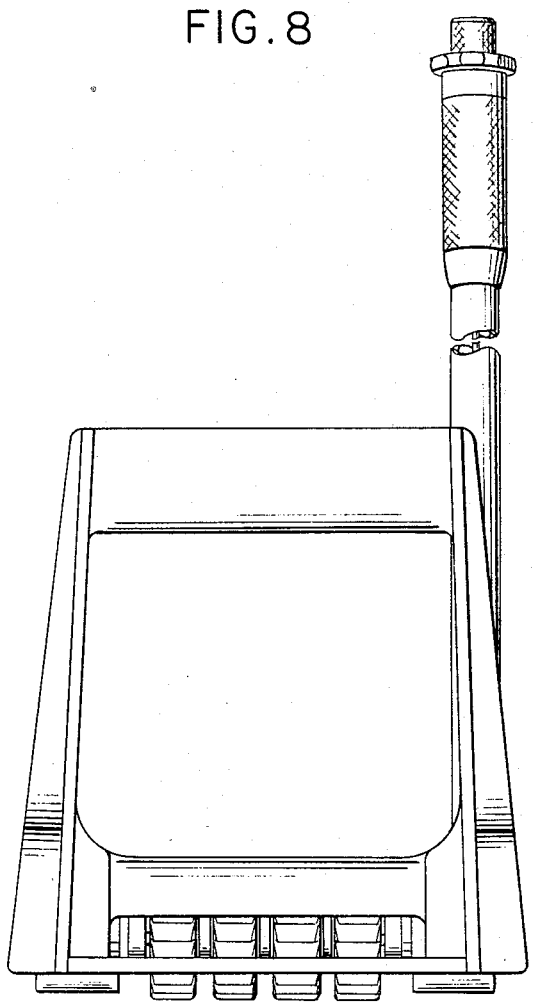
FIG. 8 is a rear elevational view of the fastening tool.
Figure 9:
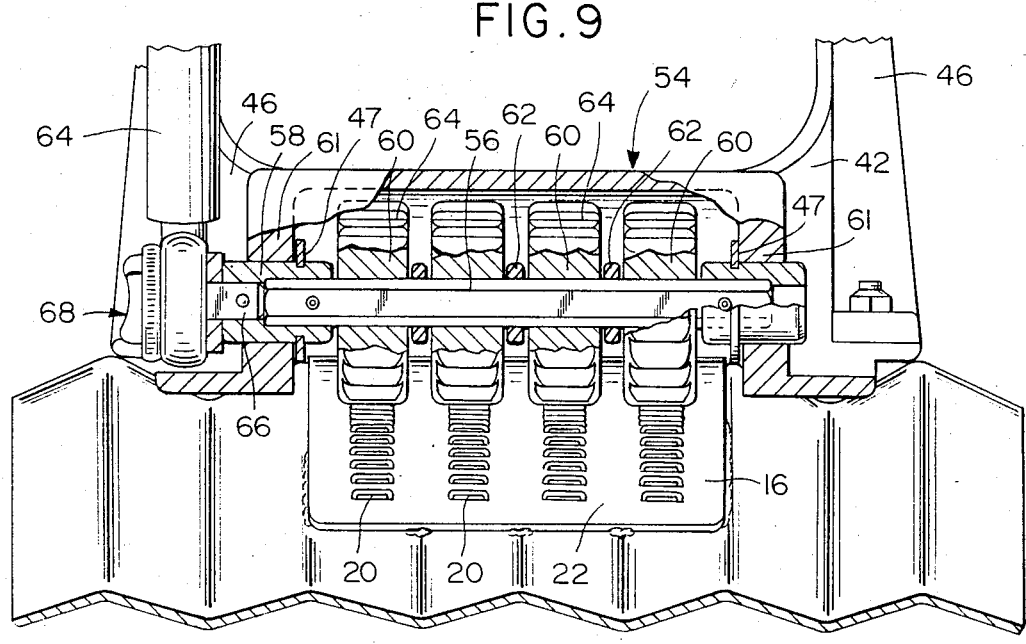
FIG. 9 is an elevational in-use view partly in section of the fastening tool and coupling band showing the relationship of the respective elements while tightening the band in forming a pipe joint.

When the band has been tightened to a required degree of tension by progressively working tongue 16 through receiver 18, tool 42 is removed, and the leading end portion 24 of the tongue will protrude from exit end 34 of the receiver. As shown in FIGS. 2-4, it is preferable in accordance with the invention to bend this end portion 24 of the tongue 16 back over the top of the receiver 18 to provide a hook-like latch with the receiver which effectively augments the latching effect obtained by the interengagement of the respective sets of ratchet teeth 20, 34 and provides additional security against withdrawal of the tongue and release of the band.

The band 10 may be corrugated to match the corrugated ends of the pipes to be connected or may be flat or may be configured or of a geometry to match the pipe ends to be coupled. O-rings, gaskets, sealing compound and the like may be included between band 10 and the pipe ends to form an effective seal against water and/or sand. The pipe joint formed by the coupling can be either a butt or overlap joint. Also, only one tongue 16 and one receptor or tab 18 are shown; however, multiple tongues 16 and tabs 18 may be used. The tongue 16 is 5¼ inches wide and fits on a band 10 from about 11 inches to about 24 inches wide. The thickness of the plate (material) used for the receptor 18 is preferably one gauge thicker than the plate used for the tongue 16. Also, the number of rows of teeth 20, 34 can vary from one to about five with four being preferable. The band 10 is coupled on the pipes with from about 10 to about 80 foot-pounds of torque with 40 foot-pounds of torque being preferred.

During coupling, the end 38 of the band 10 holding tongue 16 passes under the end 40 holding the tab 18. A depressor mechanism may be used to ensure end 38 passing under end 40. If tab 18 is spot-welded onto end 40 about 4 inches back from the edge of end 40, this greatly facilitates end 38 passing under end 40. As an alternative, the portion of tongue 16, not welded to the end 38 of band 10, can be lifted or elevated, by appropriate bends, one material thickness so that it lies slightly spaced above band 10; this facilitates end 38 passing under end 40. As a further refinement, the overlapped ends 38 and 40 can have a sealing compound located between them such as by spraying.

In addition to using a separate tongue 16 and receptor 18, the ends 38 and 40 of the band 10 can be longitudinally cut to define a tongue on end 38 and a receptor 18 on end 40. Two spaced longitudinal cuts on end 38 will free a center portion which can be stamped with ratchet teeth 20. Two longitudinal cuts on end 40 will free two side portions that can be bent up and over and stamped with ratchet teeth 32 to form receptor 18.

Referring now to FIGS. 6-11 in more detail, the tightening tool 42 includes a yoke-like, generally L-shaped metal frame 46 with a crossbar 48 and a centrally projecting handle 50 at its upper end. A transverse ramp or wedge plate 52 is secured as by bolting or screwing at the bottom and to one end of the frame substantially beneath the crossbar. A ratcheting roller assembly 54 is located at the bottom and opposite end of the frame. The configuration of frame 46 is such that it can readily be positioned over receiver 18 to straddle the receiver with wedge plate 52 fitted into the accommodation space 27 at the outlet end 34 of the receiver and with the ratcheting roller assembly 54 located adjacent the inlet end 36 of the receiver to engage the teeth 20 of tongue 16 in order to work the tongue through the receiver. Frame 46 includes two spaced depending wings 45 that engage the inlet end 36 of receiver 18.

The ratcheting assembly 54 may, for example, comprise a hexagonal shaft 56 with socketed end members 58 journalled in respective sidewalls 61 of frame 46 and held by clips 47, the shaft 56 having four ratchet wheels 60 (one wheel for each row of ratchet teeth 20 on tongue 16) non-rotatably mounted thereon, with suitable spacers 62 therebetween. The ratchet wheels 60 have ratchet teeth 64 complementary with but oppositely directed to ratchet teeth 20 on tongue 16, so that rotation of the wheels in one direction is effective to engage the respective teeth and push the tongue through the receiver, while the wheels can ratchet freely in the reverse direction, with the teeth 20 being securely engaged by the complementary teeth 34 in the receiver.

In order to provide rotation of shaft 56 and ratchet wheels 60, there is provided a lever-type handle 64 with a male drive element 66 which can be fitted in either of the socket end members 58 and held by a detent to provide a manual reciprocative ratcheting action to the wheels 60. Handle 64 may itself include a ratcheting mechanism 68 and a torque-measuring mechanism (not shown) to indicate the degree of tension to which band 10 has been tightened (generally a tension of about 40 foot-pounds is considered appropriate for a tightened band). Handle 64 and mechanism 68 together can be a torque ratchet wrench with controllable torque the best mode. The wrench can be adjustable or set at a preferred value to give ideal tension for a watertight seal, e.g., about two pounds of water gauge. It is evident that in use an operator can grasp the tool 42 in one hand by means of handle 50, place the tool in position over receiver 18 (the tongue 16 previously having been initially inserted therein), place handle 64 in either one of the sockets 58 with the other hand, and reciprocate the handle back and forth progressively to work the tongue 16 through the receiver 18 with a ratcheting action until the required degree of band tension has been obtained, when the tool is removed and the leading end of the tongue is bent back over the receiver as previously described.

In place of ratcheting handle 50, the tool could alternatively be operated by an electric drill or other electric drive mechanism, which may include a mechanical friction clutch or the like set to disengage when a required band tension has been achieved.

In order to remove the coupling band, if required, the bent over leading en of the tongue may be broken off by working back and forth, a screwdriver may be inserted into the forward end of the receiver to release the interengaged ratchet teeth on the receiver and the tongue, and the receiver may be tapped with a hammer or the like to spring the coupling band.

While the ratcheting tongue and receiver have been described as each having four rows of respective ratchet teeth, the number of rows may be varied for different applications and widths of coupling bands, with one row of teeth being considered the minimum for effective working. Wider tongues with more rows of teeth or side-by-side tongues may be used for wider coupling bands. If, for example, a coupling band having a pair of side-by-side tongues and corresponding receivers each with four rows of teeth is to be tightened, the coupling tool described above may be used and a separate roller extension may be provided to fit, for example, in one of the end members 58 and provide an additional four ratchet rollers for the respective tongues.

Another modification, for large diameter pipes, is that coupling bands may be segmented, and tongue and receiver attachments may be provided between selected segments.

In another modification of the invention, the back end 22 of a coupling tongue 16, previously described as being spot-welded to the coupling band, may be secured to the band by a releasable latch device or the like which facilitates removal and repeated use of the tongue.

In a modified form of ratcheting tool 42 which may be used in situations where the side edges of a coupling band, for example, may tend to bend upwardly, whereby difficulty may be encountered in working the leading end of the band under the trailing end when the ratcheting tongue is being fed into the receiver, the modified tool is provided with lateral extensions which may support rollers or the like at their lower ends which can be used to exert downward pressure on the edges of a band and assist in working the leading end under the trailing end.

Figures 10, 11:
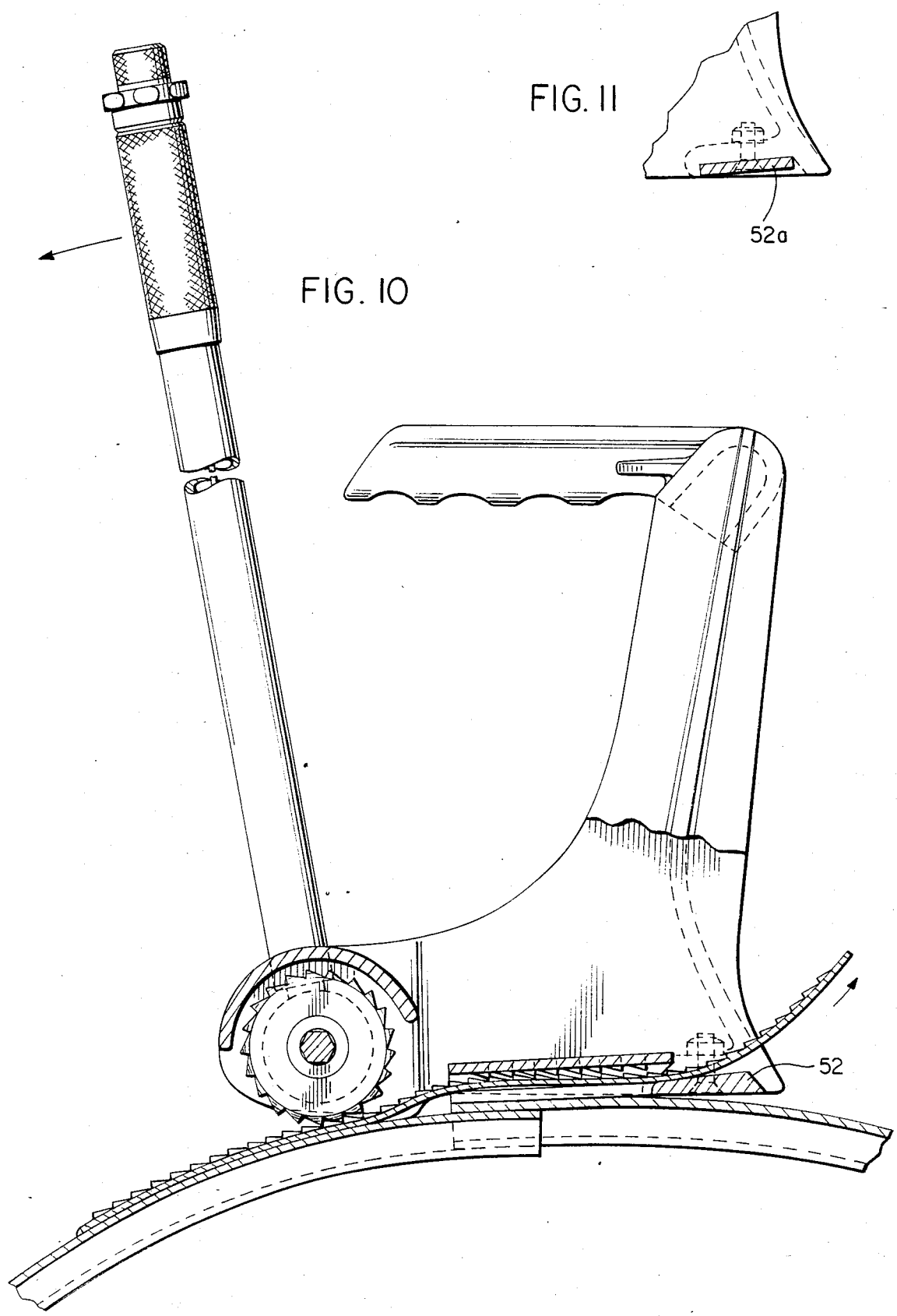
FIG. 10 is an elevational view partly in section showing the interaction between a coupling band and the fastening tool.
FIG. 11 is an elevational partial view of the fastening tool showing a variation.

In another modification, in place of using a wedge plate 52, a flat plate 52a can be attached to frame 46 at an acute angle, see FIG. 11.

Coupling bands with ratcheting tongue and receiver-type fasteners in accordance with the invention are simple to manufacture and use, eliminating the nut and bolt-type connectors commonly used in pipe coupling bands and which are subject to loss. Further, the subject bands form a coupling which is potentially more effective than known types because the bands are tightened by circumferential tension. Also, the coupling bands can be installed more quickly than conventional bands yielding reductions in labor costs.

Tool 42 fits into the recess 27 behind the trailing edge of the receptor 18. The wedge 52 guides end 24 of tab 16 upwardly as it emerges from receptor 18. The tool is intimately in contact with band 10 to pull it circumferentially. Bending tongue 16 upwardly by wedge 52 ensures latching by teeth 20, 32.

While only preferred embodiments of the invention have been described herein in detail, the invention is not limited thereby and modifications may be made within the scope of the attached claims.

I claim:

1. A coupling band for circumferentially encircling a pair of adjacent pipe ends to form a pipe joint therebetween, the coupling band having adjustable fastener means at opposite ends of the band comprising an elongated tongue at one end of the band, a longitudinal array of first ratchet teeth provided on the tongue, a channel-shaped tongue receiver on the opposite end of the band, and a longitudinal array of second ratchet teeth in the receiver complementary to the first ratchet teeth, the respective ratchet teeth being configured to allow the tongue to be fed lengthwise through the receiver in a band-tightening direction and to hold the tongue against withdrawal from the receiver in a band-releasing direction, wherein the tongue has a leading end and a trailing end and wherein substantially only a trailing end portion of the tongue is secured to the coupling band at a location which is spaced from the respective end of the band whereby in securing the band around adjacent pipe ends, an end portion of the band under the tongue can be worked beneath an opposite end portion of the band under the receiver when the tongue is worked through the receiver.

2. A coupling band as defined in claim 1 wherein the respective ratchet teeth are disposed in plural longitudinal rows.

3. A coupling band as defined in claim 1 wherein the trailing end portion of the tongue is secured to the band by spot welding.

4. A coupling band as defined in claim 3 wherein the receiver includes sidewalls and a top wall, the first ratchet teeth being formed on an upper surface of the tongue and the second ratchet teeth being formed on the top wall of the receiver.

5. A coupling band as defined in claim 1 in combination with a pair of pipe sections, the coupling band circumferentially encircling adjacent ends of the pipe sections and forming a pipe joint therebetween, the tongue being inserted through the receiver with the respective ratchet teeth being in engagement for holding the tongue against withdrawal, a leading end portion of the tongue extending from an outlet end of the receiver and being bent back over the top of the receiver in the form of a hook providing additional security against withdrawal of the tongue from the receiver.

6. A combination comprising a coupling band for circumferentially encircling a pair of adjacent pipe ends to form a pipe joint therebetween, the coupling band having adjustable fastener means at opposite ends of the band comprising an elongated tongue at one end of the band, a longitudinal array of first ratchet teeth provided on the tongue, a channel-shaped tongue receiver on the opposite end of the band, and a longitudinal array of second ratchet teeth in the receiver complementary to the first ratchet teeth, the respective ratchet teeth being configured to allow the tongue to be fed lengthwise through the receiver in a band-tightening direction and to hold the tongue against withdrawal from the receiver in a band-releasing direction, a manual ratcheting tool for fitting over the receiver and working the tongue through the receiver when tensioning the band around a pair of adjacent pipe ends to form a pipe joint, the ratcheting tool comprising a frame for fitting over the receiver, a handle on the frame, a ratcheting roller means at one end of the frame for positioning adjacent an entry end of the receiver over the tongue, the roller means having a circumferential array of third ratchet teeth complementary with and oppositely directed to the first ratchet teeth for engaging the first ratchet teeth and working the tongue through the receiver with a ratcheting action in the band-tightening direction responsive to rotation of the roller means, the tool further including operating means for rotating the roller means.

7. The combination as defined in claim 6 wherein the tool further includes a wedge plate at an end of the frame opposite the roller means for positioning at an outlet end of the receiver to guide a leading end of the tongue upwardly as it emerges from the receiver when the band is being tensioned by operation of the tool.

8. The combination as defined in claim 7 wherein the receiver has a cutaway portion at the outlet end for receiving the wedge plate.

9. The combination as defined in claim 7 wherein the roller means is mounted on a roller shaft journally supported in the frame and wherein the operating means includes releasable drive connection means at opposite ends of the shaft for insertion of an operating lever and the like.

* * * * *